(12) United States Patent
Kim et al.

(10) Patent No.: US 12,474,254 B2
(45) Date of Patent: Nov. 18, 2025

(54) TRANSPARENT ULTRASONIC SENSOR-BASED ULTRASONIC OPTICAL COMPOSITE IMAGING SYSTEM

(71) Applicant: POSTECH ACADEMY-INDUSTRY FOUNDATION, Pohang-si (KR)

(72) Inventors: Chulhong Kim, Pohang-si (KR); Hyung Ham Kim, Pohang-si (KR); Jeongwoo Park, Daegu (KR); Byullee Park, Gwangju (KR); Moongyu Han, Pohang-si (KR); Jooongho Ahn, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 18/116,229

(22) Filed: Mar. 1, 2023

(65) Prior Publication Data

US 2023/0204492 A1  Jun. 29, 2023

Related U.S. Application Data

(63) Continuation of application No. PCT/KR2021/000106, filed on Jan. 6, 2021.

(30) Foreign Application Priority Data

Sep. 1, 2020 (KR) .................. 10-2020-0110777

(51) Int. Cl.
*G01N 21/17* (2006.01)

(52) U.S. Cl.
CPC . *G01N 21/1702* (2013.01); *G01N 2021/1706* (2013.01); *G01N 2201/06113* (2013.01)

(58) Field of Classification Search
CPC ............ G01N 21/1702; G01N 21/645; G01N 2021/1706; G01N 2021/1787;
(Continued)

(56) References Cited

U.S. PATENT DOCUMENTS

| 5,488,954 A | 2/1996 | Sleva et al. |
| 5,488,957 A | 2/1996 | Frey et al. |

(Continued)

FOREIGN PATENT DOCUMENTS

| JP | S60143743 A | 7/1985 |
| JP | S61-225611 A2 | 10/1986 |

(Continued)

OTHER PUBLICATIONS

International Search Report of Application No. PCT/KR2021/000106, dated Apr. 30, 2021, 8 pages including translation.

(Continued)

*Primary Examiner* — Suman K Nath
(74) *Attorney, Agent, or Firm* — Morgan, Lewis & Bockius LLP

(57) ABSTRACT

Disclosed herein is a transparent ultrasonic sensor-based ultrasonic optical composite imaging system including at least one light source and a transparent ultrasonic sensor coaxially aligned with light emitted from the light source and allowing the light emitted from the light source to be transmitted therethrough, wherein the transparent ultrasonic sensor is disposed between the light source and a subject.

16 Claims, 11 Drawing Sheets

(58) Field of Classification Search
CPC .............. G01N 2021/392; G01N 2201/06113; G01N 29/0654; G01N 29/221; G01N 29/2418; G01N 29/225; G01N 29/265; G01N 29/223; G01N 29/0618; G01N 29/14; A61B 8/00

See application file for complete search history.

(56) References Cited

U.S. PATENT DOCUMENTS

| | | | |
|---|---|---|---|
| 6,776,763 | B2 | 8/2004 | Nix et al. |
| 6,857,501 | B1 | 2/2005 | Han et al. |
| 8,879,352 | B2 | 11/2014 | Witte et al. |
| 8,880,141 | B2 | 11/2014 | Chen |
| 11,609,326 | B2 | 3/2023 | Lam et al. |
| 11,768,288 | B2 | 9/2023 | Lam et al. |
| 2003/0187319 | A1 | 10/2003 | Kaneko et al. |
| 2005/0187471 | A1 | 8/2005 | Kanayama et al. |
| 2007/0291275 | A1 | 12/2007 | Diamond |
| 2009/0005685 | A1 | 1/2009 | Nagae et al. |
| 2010/0268042 | A1 | 10/2010 | Wang et al. |
| 2010/0268058 | A1 | 10/2010 | Chen |
| 2012/0029829 | A1 | 2/2012 | Li et al. |
| 2013/0042688 | A1 | 2/2013 | Luo et al. |
| 2013/0109950 | A1 | 5/2013 | Herzog et al. |
| 2013/0190591 | A1 | 7/2013 | Hirson et al. |
| 2014/0182385 | A1 | 7/2014 | Oh et al. |
| 2014/0350368 | A1 | 11/2014 | Irisawa |
| 2014/0355387 | A1 | 12/2014 | Kitchens, II et al. |
| 2015/0265155 | A1 | 9/2015 | Zalev et al. |
| 2016/0150973 | A1 | 6/2016 | Abe |
| 2017/0065182 | A1 | 3/2017 | Wang et al. |
| 2017/0079622 | A1 | 3/2017 | O'Donnell et al. |
| 2017/0215737 | A1 | 8/2017 | Suehira et al. |
| 2017/0231503 | A1* | 8/2017 | Nakatsuka ............... A61B 8/13 600/407 |
| 2018/0055369 | A1 | 3/2018 | Burns et al. |
| 2018/0309043 | A1 | 10/2018 | Kobrin et al. |
| 2018/0368697 | A1 | 12/2018 | Fukutani et al. |
| 2019/0050618 | A1* | 2/2019 | Khuri-Yakub ........ G06F 3/0436 |
| 2019/0090734 | A1* | 3/2019 | Komiyama .......... A61B 8/4483 |
| 2020/0069189 | A1 | 3/2020 | Schwarz |
| 2020/0173965 | A1 | 6/2020 | Sangu |
| 2021/0050507 | A1 | 2/2021 | Li et al. |
| 2022/0133273 | A1 | 5/2022 | Dangi et al. |
| 2022/0183564 | A1 | 6/2022 | Xia et al. |
| 2024/0163615 | A1 | 5/2024 | Takekuma et al. |

FOREIGN PATENT DOCUMENTS

| | | |
|---|---|---|
| JP | H0833097 A | 2/1996 |
| JP | 2001299758 A | 10/2001 |
| JP | 2004147940 A | 5/2004 |
| JP | 2004351023 A | 12/2004 |
| JP | 4118737 B2 | 7/2008 |
| JP | 4406226 B2 | 1/2010 |
| JP | 4643153 B2 | 3/2011 |
| JP | 2013106823 A | 6/2013 |
| JP | 2014-068751 A2 | 4/2014 |
| JP | 5614869 B2 | 10/2014 |
| JP | 2015116254 A | 6/2015 |
| JP | 5823322 B2 | 11/2015 |
| JP | 2016007256 A | 1/2016 |
| JP | 5860822 B2 | 2/2016 |
| JP | 6006773 B2 | 10/2016 |
| JP | 2018189498 A | 11/2018 |
| JP | 2019146967 A | 9/2019 |
| JP | 2020-034319 A2 | 3/2020 |
| JP | 2020-036898 A2 | 3/2020 |
| JP | 2020530622 A | 10/2020 |
| JP | 6845009 B2 | 3/2021 |
| KR | 20150035850 A | 4/2015 |
| KR | 20150135335 A | 12/2015 |
| KR | 20160089816 A | 7/2016 |
| KR | 1830109 B1 | 2/2018 |
| KR | 101830209 B1 | 2/2018 |
| KR | 10-2019-0028955 A | 3/2019 |
| KR | 20190031834 A | 3/2019 |
| KR | 20190116805 A | 10/2019 |
| KR | 102045470 B1 | 11/2019 |
| KR | 20200032227 A | 3/2020 |
| KR | 10-2020-0128785 A | 11/2020 |
| KR | 20200132084 A | 11/2020 |
| WO | 2020167870 A1 | 8/2020 |

OTHER PUBLICATIONS

Written Opinion of the International Searching Authority of Application No. PCT/KR2021/000106, dated Apr. 30, 2021, 10 pages including translation.

International Search Report and Written Opinion for Application No. PCT/KR2020/004846, mailed Jul. 17, 2020, 19 pages including translation.

Wang M et al: "A photoacoustic imager with infrared illumination through the CMUT chip", 2011 16th International Solid-State Sensors, Actuators and Microsystems Conference (Transducers 2011); Beijing, China; Jun. 5-9, 2011, IEEE, Piscataway, NJ, Jun. 5, 2011 (Jun. 5, 2011), pp. 2188-2191, XP031910730, DOI: 10.1109/TRANSDUCERS.2011.5969389 ISBN: 978-1-4577-0157-3.

Office Action in Korean Application No. 10-2020-0039208, dated Dec. 2, 2021, 5 pages.

Office Action in Chinese Application No. 202080080138.0, dated Apr. 30, 2024, 7 pages.

Office Action in Japanese Application No. 2022-517355, dated Apr. 27, 2023, 6 pages including translation.

Office Action in U.S. Appl. No. 17/762,008, dated Mar. 27, 2025, 12 pages.

Office Action in Korean Application No. 10-2020-0110777, dated Aug. 26, 2021, 4 pages.

Office Action in Korean Application No. 10-2020-0110777, dated Feb. 23, 2022, 3 pages.

Office Action in Japanese Application No. 2023-514471, dated Feb. 6, 2024, 7 pages.

Notice of Allowance in Korean Application No. 10-2021-0014148, dated Dec. 19, 2022, 6 pages.

Office Action in Korean Application No. 10-2021-0014148, dated May 24, 2022, 5 pages.

Office Action in EP 21923354.1, dated Mar. 12, 2025, 4 pages.

Office Action in Japanese Application No. 2023-546567, dated Jun. 4, 2024, 5 pages.

Office Action in U.S. Appl. No. 18/301,202, dated Sep. 18, 2024, 26 pages.

Office Action in U.S. Appl. No. 18/301,202, dated Mar. 31, 2025, 25 pages.

International Search Report and Written Opinion in Application No. PCT/KR2021/005468, dated Oct. 20, 2021, 16 pages including translation.

Xi et al., "Photoacoustic imaging based on MEMS mirror scanning", 2010 (Year: 2010).

Notice of Allowance in Japanese Application No. 2022-517355, dated Nov. 14, 2023, 3 pages.

Notice of Allowance in Japanese Application No. 2023-546567, dated Nov. 26, 2024, 3 pages.

Notice of Allowance in Japanese Application No. 2023-514471, dated Nov. 12, 2024, 3 pages.

Notice of Allowance in Korean Application No. 10-2020-0039208, dated Jun. 15, 2022, 5 pages.

Notice of Allowance in Korean Application No. 10-2020-0110777, dated Aug. 3, 2022, 5 pages.

Fang et al., "A Focused Optically Transparent PVDF Transducer for Photoacoustic Microscopy", 2019 (Year: 2019).

Chen et al., "Optical-Resolution Photoacoustic Microscopy Using Transparent Ultrasound Transducer", 2019 (Year: 2019).

Dangi et al., "Lithium niobate-based transparent ultrasound transducers for photoacoustic imaging", 2019 (Year: 2019).

Chen et al., "Transparent High-Frequency Ultrasonic Transducer for Photoacoustic Microscopy Application", 2020 (Year: 2020).

(56) References Cited

OTHER PUBLICATIONS

Park et al., "Optically Transparent Focused Transducers for Combined Photoacoustic and Ultrasound Microscopy", 2020 (Year: 2020).

Park et al., "Handheld Photoacoustic Microscopy Probe", 2017 (Year: 2017).

Office Action in U.S. Appl. No. 18/301,202, dated Sep. 11, 2025, 26 pages.

\* cited by examiner

TRANSPARENT ULTRASONIC SENSOR-BASED ULTRASONIC OPTICAL COMPOSITE IMAGING SYSTEM

CROSS-REFERENCE TO RELATED APPLICATIONS

This is a continuation of International Application PCT/KR2021/000106, filed on Jan. 6, 2021, which claims the benefit of Korean Application No. 10-2020-0110777, filed on Sep. 1, 2020, the entirety of each of which is incorporated herein by reference for all purposes.

TECHNICAL FIELD

The present disclosure relates to a transparent ultrasonic sensor-based ultrasonic optical composite imaging system, and more particularly, to a transparent ultrasonic sensor-based ultrasonic optical composite imaging system capable of improving a signal-to-noise ratio (SNR) and reducing a size of a device by utilizing a transparent ultrasonic sensor enabling coaxialization of an ultrasound path and an optical path.

BACKGROUND ART

Multi-modal images based on optics and ultrasonic waves have a wide range of applications and have the advantages of improving accuracy in medical diagnosis, for example.

Accordingly, studies have been conducted on combining an existing ultrasonic imaging system with an optical imaging system, combining the ultrasonic imaging system with an optical coherence tomography (OCT) imaging system, or combining the ultrasonic imaging system with a fluorescence imaging system.

However, the conventional ultrasonic sensors are opaque. Therefore, when the conventional ultrasonic sensor (or an ultrasonic transducer (UT), hereinafter, ultrasonic sensor, ultrasonic transducer, and UT which is an abbreviation thereof are used to have the same meaning) is used in multi-modal imaging having an optical system, the optical system cannot pass through the conventional opaque UT having an optical system, the conventional ultrasonic sensor had to be placed off the axis of the UT (un-axis insertion). This un-axis insertion is disadvantageous in taking images for various reasons. For example, problems, such as misalignment of the system, increase in complexity, increase in system size, and decrease in signal-to-noise ratio (SNR), have occurred.

FIG. 1 is a view showing the principle of a photoacoustic microscope using a conventional opaque ultrasonic sensor.

As shown in FIG. 1, in the case of a photoacoustic microscope using a conventional opaque ultrasonic sensor, light cannot pass through the ultrasonic sensor. Therefore, in order to separate an optical path and an ultrasonic signal path, ancillary elements, such as a prism and silicon oil, need to be disposed inevitably. As a result, the size of a system significantly increases. In addition, as an ultrasonic signal passes inside an optical system, such as a prism, a signal-to-noise ratio (SNR) deteriorates poor due to energy loss.

Meanwhile, in order to solve the problem of the opaque ultrasonic sensor, in U.S. Pat. No. 8,784,321, a portion of a cross-section of the opaque ultrasonic sensor is perforated to form an optical path, so that the optical path and an ultrasound path are located on the same axis. However, even in this case, since light may pass through only a portion of the cross-section of the ultrasonic sensor, the problem due to light non-transmittance of the ultrasonic sensor cannot be sufficiently solved.

Meanwhile, in order to solve the problem of imaging due to the opaque ultrasonic sensor, a transparent ultrasonic sensor (or a transparent ultrasonic transducer, and a TUT which is an abbreviation thereof, are used to have the same meaning in this specification) have been developed in recent years. However, some TUTs still have limitations in obtaining a high SNR and high-resolution photoacoustic images due to low transparency, low sensitivity, or wide focusing. Some groups have developed a transparent capacitive micro-machined ultrasonic transducer, which, however, cannot be commercialized because the ultrasonic intensity is low or a high bias voltage is required.

The inventors of the present application have proposed a lithium niobate (LNO)-based single crystal transparent ultrasonic sensor structure and a method for manufacturing the same in Korea patent Application No. 210-2020-0039208 ("Transparent Ultrasonic Sensor and Manufacturing Method Thereof").

Therefore, in order to utilize the LNO-based single-crystal transparent ultrasonic sensor presented in the previous study, a follow-up study on a transparent ultrasonic sensor-based ultrasonic optical composite imaging system capable of capturing photoacoustic images, OCT images, fluorescence images, and various optical images using light, together with ultrasound images, with a single device has been conducted.

DETAILED DESCRIPTION OF THE INVENTION

Technical Challenges

An object of the present disclosure is to provide a transparent ultrasonic sensor-based ultrasonic optical composite imaging system capable of improving a signal-to-noise ratio (SNR) and reducing a size of a device by utilizing a transparent ultrasonic sensor enabling coaxialization of an ultrasound path and an optical path.

DISCLOSURE

Technical Problem

An object of the present disclosure is to provide a transparent ultrasonic sensor-based ultrasonic optical composite imaging system capable of improving SNR and miniaturizing the device by utilizing a transparent ultrasonic sensor enabling coaxialization of an ultrasound path and an optical path.

Technical Solution

According to an embodiment of the present disclosure, a transparent ultrasonic sensor-based ultrasonic optical composite imaging system includes: at least one light source; and a transparent ultrasonic sensor coaxially aligned with light emitted from the light source and allowing the light emitted from the light source to be transmitted therethrough, wherein the transparent ultrasonic sensor is disposed between the light source and a subject.

The transparent ultrasonic sensor-based ultrasonic optical composite imaging system may further include: an optical system between the light source and the transparent ultrasonic sensor.

The transparent ultrasonic sensor-based ultrasonic optical composite imaging system may further include: an optical system between the transparent ultrasonic sensor and the subject.

The transparent ultrasonic sensor-based ultrasonic optical composite imaging system may further include: a mechanical scanner performing mechanical scanning by moving the light source and the transparent ultrasonic sensor as one unit.

The transparent ultrasonic sensor-based ultrasonic optical composite imaging system may further include: a mechanical scanner performing mechanical scanning by moving the subject.

The transparent ultrasonic sensor-based ultrasonic optical composite imaging system may further include: an optical scanner disposed between the transparent ultrasonic sensor and the subject.

The transparent ultrasonic sensor-based ultrasonic optical composite imaging system may further include: an optical scanner disposed between the light source and the transparent ultrasonic sensor.

The optical scanner may be any one of various reflectors, such as a galvanometer scanner and a micro-electro-mechanical system (MEMS) scanner.

The transparent ultrasonic sensor may include: a matching unit performing optical impedance matching and formed of a transparent material; a piezoelectric layer located behind the matching unit and formed of a transparent material; a first electrode layer and a second electrode layer located on a rear surface and a front surface of the piezoelectric layer, respectively, the first electrode layer and the second electrode layer being formed of a transparent conductive material; a first housing connected to the first electrode layer; and a second housing connected to the second electrode layer.

The matching unit of the transparent ultrasonic sensor may include an acoustic lens.

The acoustic lens of the transparent ultrasonic sensor may have a shape of any one of a concave lens, a convex lens, and a plane lens.

The matching unit of the transparent ultrasonic sensor may include at least one of transparent glass, transparent epoxy, and transparent silicone.

The piezoelectric layer of the transparent ultrasonic sensor may be a piezoelectric material having optically transparent characteristics.

The piezoelectric layer of the transparent ultrasonic sensor may include at least one of LNO, PMN-PT, PVDF and PVDF-TrFE.

The first electrode layer and the second electrode layer of the transparent ultrasonic sensor may be electrodes having optically transparent characteristics.

The first electrode layer and the second electrode layer of the transparent ultrasonic sensor may each include at least one of AgNW, ITO, carbon nanotube, and graphene.

Sizes of the first electrode layer and the second electrode layer of the transparent ultrasonic sensor may be different from each other.

Each of the first housing and the second housing of the transparent ultrasonic sensor may be formed in a ring shape having an empty space in the middle.

The first housing of the transparent ultrasonic sensor may be located in contact with an edge portion of the first electrode layer, and the second housing of the transparent ultrasonic sensor may be located in contact with an edge portion of the second electrode layer.

The piezoelectric layer, the first electrode layer, and the first housing may be located in an internal space of the second housing of the transparent ultrasonic sensor.

The first housing and the second housing of the transparent ultrasonic sensor may include a conductive material.

The transparent ultrasonic sensor-based ultrasonic optical composite imaging system may further include: a first signal line connected to the first housing of the transparent ultrasonic sensor and a second signal line connected to the second housing of the transparent ultrasonic sensor.

The transparent ultrasonic sensor-based ultrasonic optical composite imaging system may further include: a rear layer located in contact with the first electrode layer of the transparent ultrasonic sensor and damping an ultrasonic signal.

The rear layer of the transparent ultrasonic sensor may be surrounded by the first housing.

The rear layer of the transparent ultrasonic sensor may include transparent glass or transparent epoxy.

The transparent ultrasonic sensor-based ultrasonic optical composite imaging system may further include: an insulating unit located between the first housing and the second housing of the transparent ultrasonic sensor and formed of a transparent insulating material.

The transparent ultrasonic sensor-based ultrasonic optical composite imaging system may further include a protective layer located in front of the matching unit of the transparent ultrasonic sensor and performing acoustic impedance matching.

The protective layer of the transparent ultrasonic sensor may include parylene.

The transparent ultrasonic sensor-based ultrasonic optical composite imaging system may further include: a correction lens located behind the matching layer of the transparent ultrasonic sensor, controlling a focus of light passing through the matching layer, and formed of a transparent material.

The correction lens of the transparent ultrasonic sensor may have a convex shape.

According to another embodiment of the present disclosure, a transparent ultrasonic sensor-based ultrasonic optical composite imaging system includes: two or more light sources; a light source selecting unit selectively outputting at least one of the two or more light sources; and a transparent ultrasonic sensor coaxially aligned with the at least one light source selected by the light source selecting unit and allowing light emitted from the light source to be transmitted therethrough, wherein the transparent ultrasonic sensor is disposed between the light source and a subject.

Advantageous Effects

The present disclosure has an effect of implementing a transparent ultrasonic sensor-based ultrasonic optical composite imaging system capable of improving a signal-to-noise ratio (SNR) and reducing a size of a device by utilizing a transparent ultrasonic sensor enabling coaxialization of an ultrasound path and an optical path.

In addition, when the transparent ultrasonic sensor is combined with the light source, light emitted from the light source is irradiated to a sample through the transparent ultrasonic sensor, and thus, the inconvenience of designing the system so that the light bypasses the ultrasonic sensor when the light source is combined with the ultrasonic sensor may be eliminated.

In addition, there is an effect of simultaneously acquiring an ultrasound image/signal and an optical image/signal at exactly the same position of a sample.

In addition, there is an effect of implementing a multi-modal composite imaging system by simultaneously combining with various light sources.

In addition, the transparent ultrasonic sensor-based ultrasonic optical composite imaging system may be used in various medical imaging fields requiring comprehensive information for accurate diagnosis.

MODES OF PRACTICE

Hereinafter, various embodiments of a transparent ultrasonic sensor-based ultrasonic optical composite imaging system according to the present disclosure are described in detail with reference to the accompanying drawings.

Ultrasonic sensors, ultrasonic transducers, and ultrasonic probes are all used as terms indicating the same object. This is the same throughout the specification.

Figure 1:
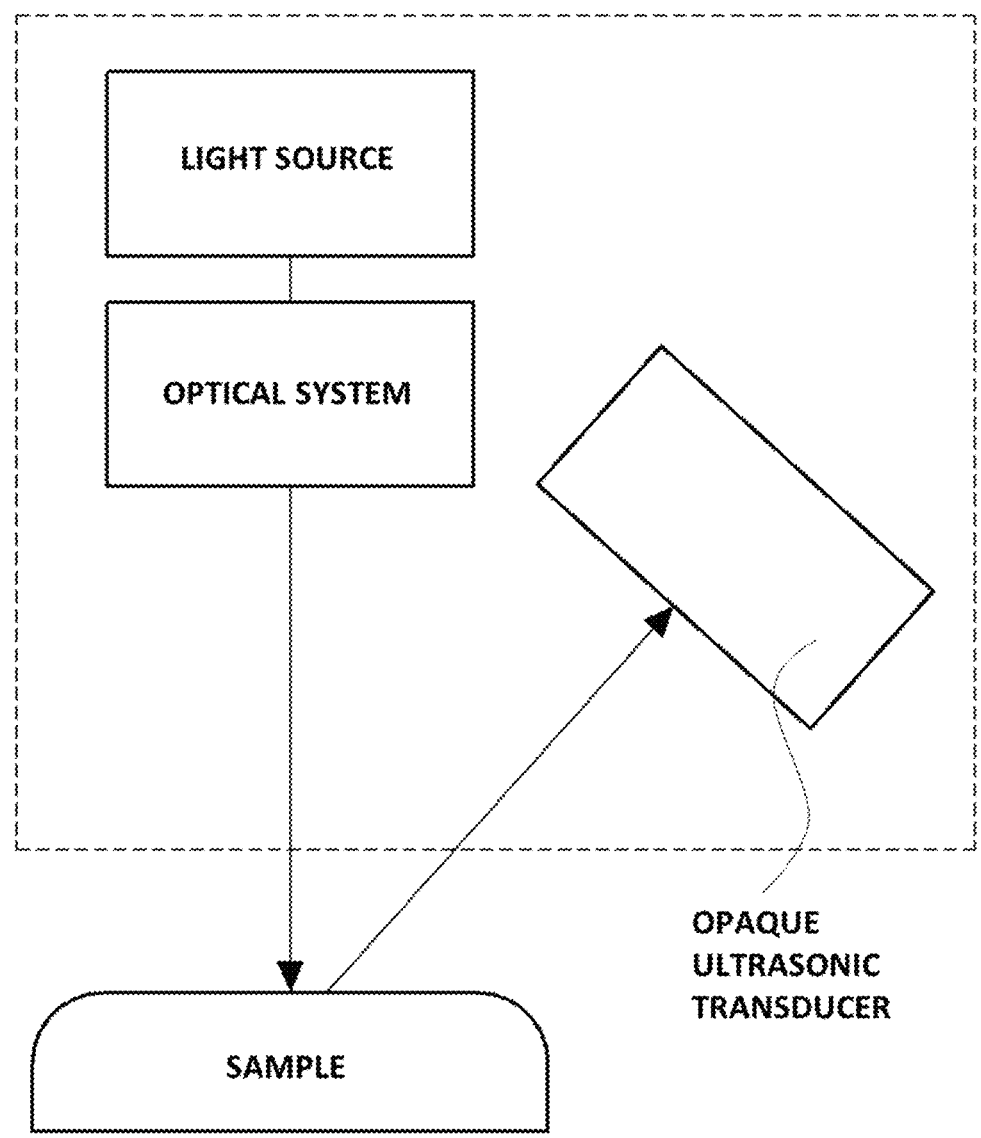
FIG. 1 is a view showing the principle of a photoacoustic microscope using a conventional opaque ultrasonic sensor.
Figure 2:
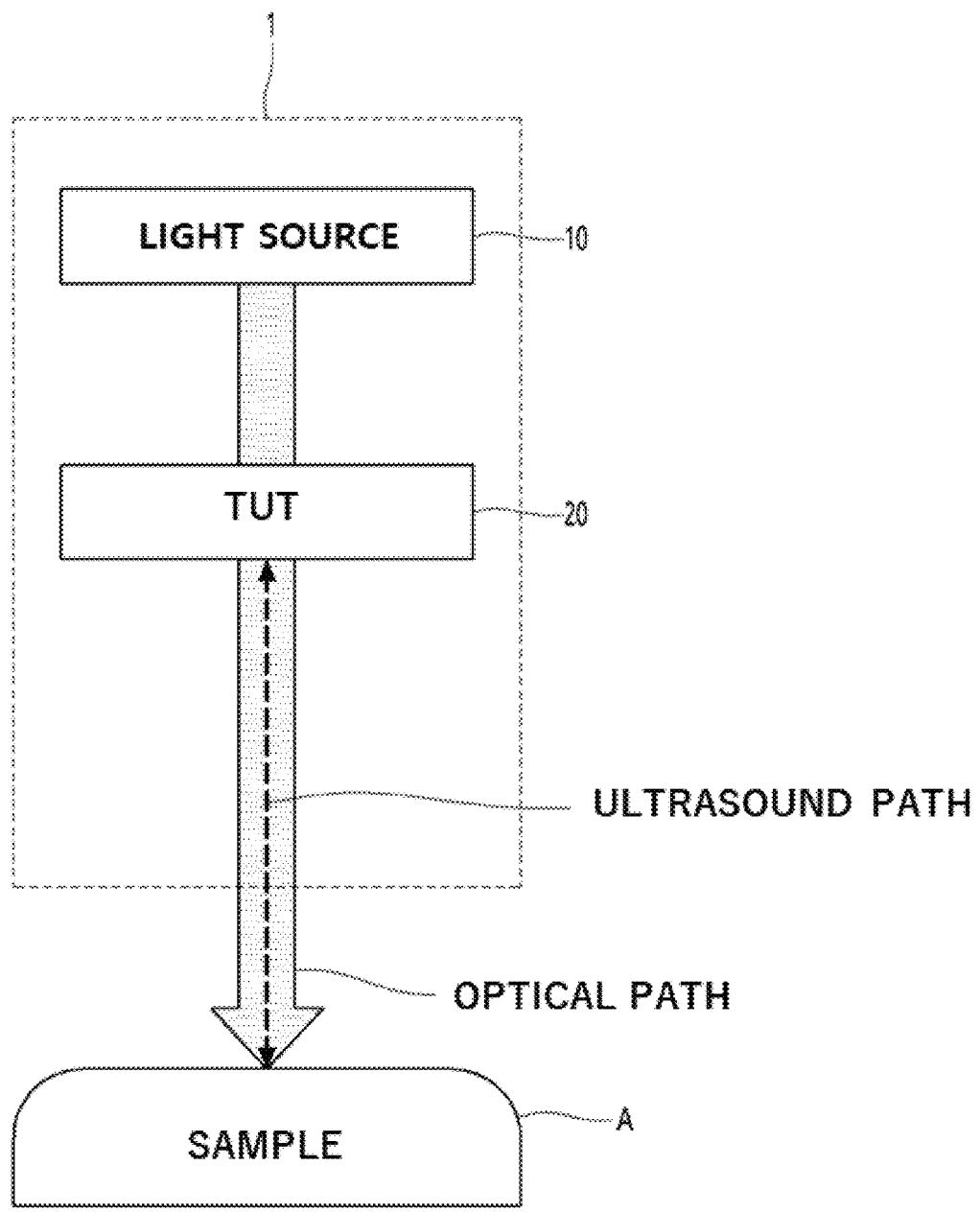
FIG. 2 is a block diagram showing a first embodiment of a transparent ultrasonic sensor-based ultrasonic optical composite imaging system.

FIG. 2 is a block diagram illustrating a first embodiment of a transparent ultrasonic sensor-based ultrasonic optical composite imaging system.

As shown in FIG. 2, a transparent ultrasonic sensor-based ultrasonic optical composite imaging system 1 includes a light source 10 and a transparent ultrasonic sensor (or a transparent ultrasonic transducer (TUT)) 20.

As the light source 10, various types of light sources having appropriate wavelengths may be used depending on the purpose.

For example, when the transparent ultrasonic sensor-based ultrasonic optical composite imaging system 1 is used as a photoacoustic microscope, the light source 10 may be, for example, a pulse laser light source having a wavelength of 532 nm.

Alternatively, when the transparent ultrasonic sensor-based ultrasonic optical composite imaging system 1 is used as a fluorescence imaging device, the light source 10 may be, for example, a continuous wave (CVV) laser light source having a wavelength of 488 nm.

Alternatively, when the transparent ultrasonic sensor-based ultrasonic optical composite imaging system 1 is used as an optical coherence tomography (OCT) imaging device, the light source 10 may be, for example, a superluminescent LED (SLED) light source having a center wavelength of 860 nm.

In any case, light emitted from the light source 10 of the transparent ultrasonic sensor-based ultrasonic optical composite imaging system 1 is coaxially aligned with the TUT 20.

When the embodiment of FIG. 2 is a photoacoustic microscope, laser light emitted from the light source 10 is absorbed by a sample A and coaxially aligned with a path of ultrasonic waves generated in the sample A as a result of thermoelastic expansion. Consequently, in the case of implementing the photoacoustic microscope according to the embodiment of FIG. 2, if a composite image obtained by combining a photoacoustic image and an ultrasound image is generated, a composite image captured at exactly the same point may be obtained.

FIGS. 3(a) to 3(d) are diagrams showing types of transparent ultrasonic sensors.

The transparent ultrasonic sensor used in the TUT 20 of the transparent ultrasonic sensor-based ultrasonic optical composite imaging system 1 may be a single element, but an array-type transparent ultrasonic sensor in which a plurality of single elements are arranged may also be configured to be used.

Figure 3A:
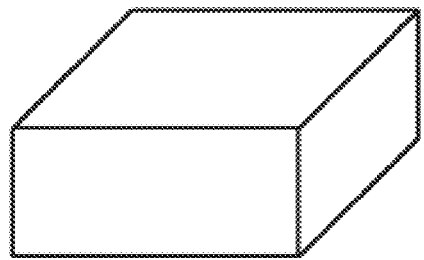
FIGS. 3(a) to 3(d) are views showing types of transparent ultrasonic sensors.
Figure 3B:
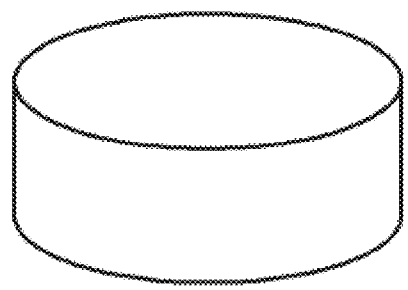

FIG. 3(a) illustrates a square single-element type transparent ultrasonic sensor and FIG. 3(b) illustrates a disc-shaped single-element type transparent ultrasonic sensor.

Figure 3C:
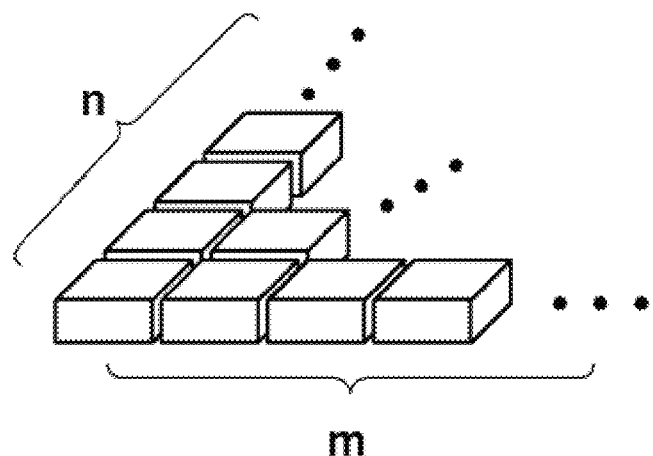

FIG. 3(c) illustrates a square transparent ultrasonic sensor array in which m×n square transparent ultrasonic sensors are arranged.

Figure 3D:
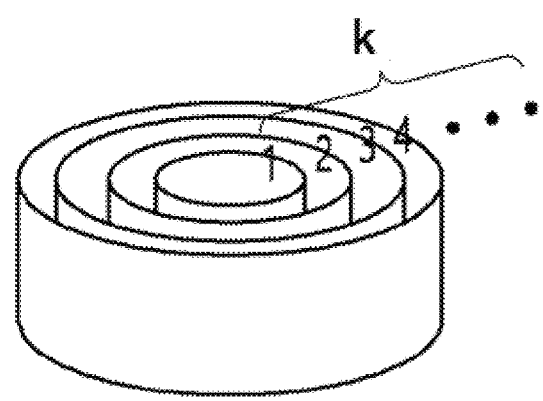

FIG. 3(d) illustrates a circular transparent ultrasonic sensor array in which a plurality of disk-shaped transparent ultrasonic sensors are arranged in k concentric circles.

Furthermore, any transparent ultrasonic sensor of FIGS. 3(a) to 3(d) may be freely configured as a focused type or an unfocused type according to the purpose.

Figure 4:
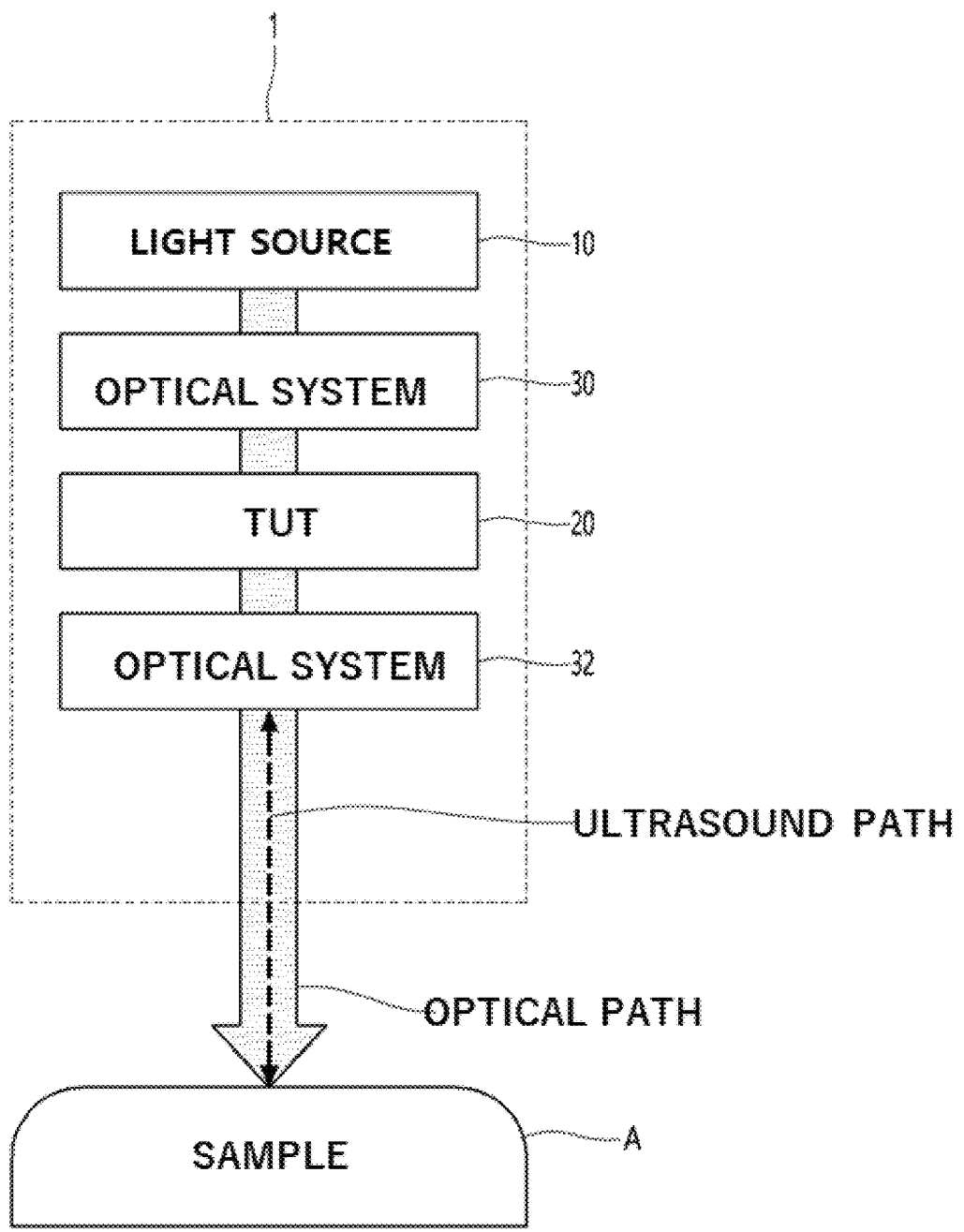
FIG. 4 is a block diagram showing a second embodiment of a transparent ultrasonic sensor-based ultrasonic optical composite imaging system.

FIG. 4 is a block diagram illustrating a second embodiment of a transparent ultrasonic sensor-based ultrasonic optical composite imaging system.

The embodiment shown in FIG. 4 relates to an embodiment in which an optical system is added to the transparent ultrasonic sensor-based ultrasonic optical composite imaging system according to the embodiment of FIG. 2.

As shown in FIG. 4, in the transparent ultrasonic sensor-based ultrasonic optical composite imaging system 1, optical systems 30 and 32 may be added to at least one of between the light source 10 and the TUT 20 and between the TUT 20 and the sample A.

The optical systems 30 and 32 include various combinations of lenses, mirrors, filters, splitters, combiners, and combinations of at least some thereof as necessary to suit the purpose and function of the transparent ultrasonic sensor-based ultrasonic optical composite imaging system 1.

Figure 5:
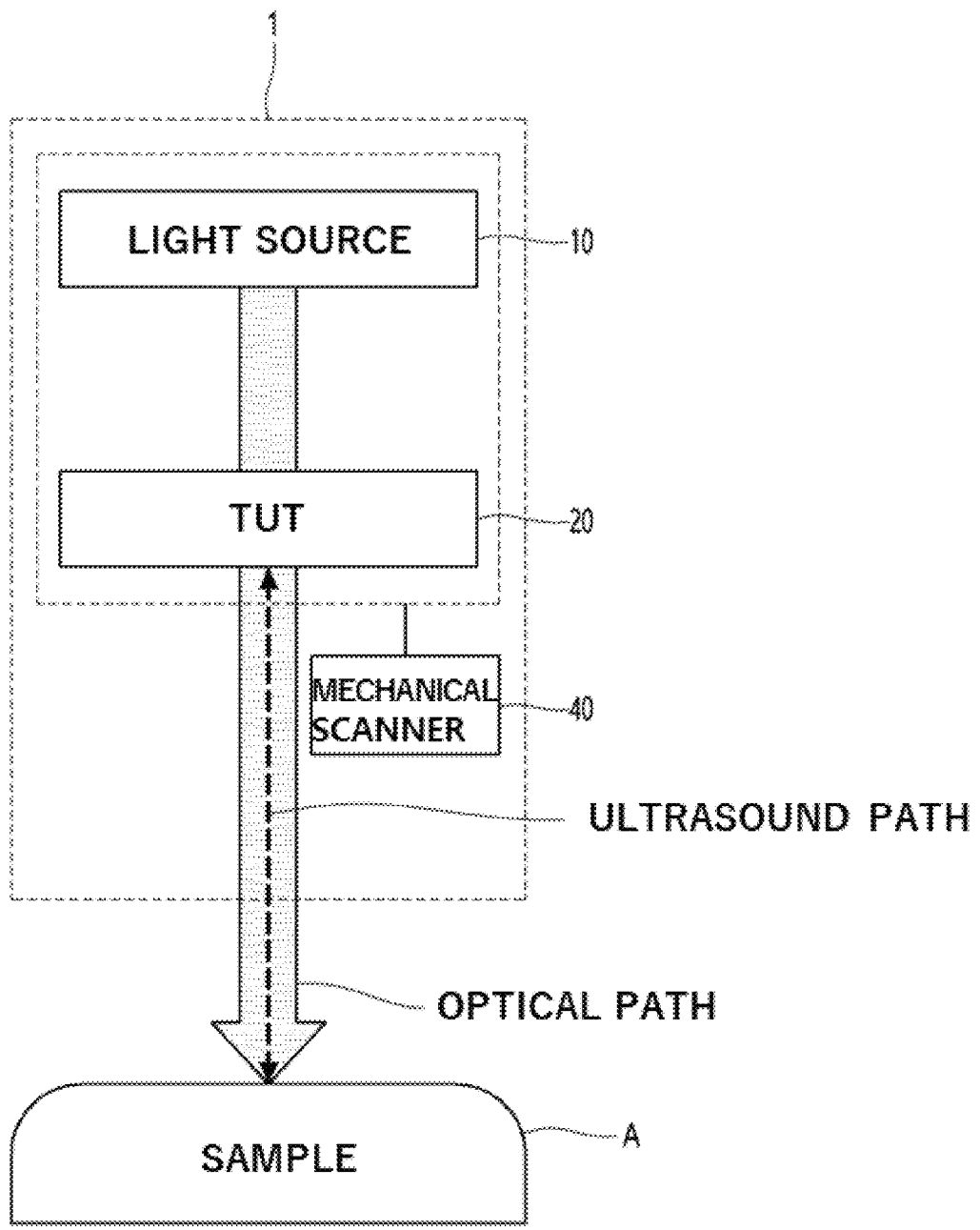
FIG. 5 is a block diagram showing a third embodiment of a transparent ultrasonic sensor-based ultrasonic optical composite imaging system.

FIG. 5 is a block diagram illustrating a third embodiment of a transparent ultrasonic sensor-based ultrasonic optical composite imaging system.

As shown in FIG. 5, the transparent ultrasonic sensor-based ultrasonic optical composite imaging system 1 may be configured to further include a mechanical scanner 40 in addition to the light source 10 and the TUT 20.

The transparent ultrasonic sensor-based ultrasonic optical composite imaging system 1 may have to scan an imaging surface of the sample A depending on the purpose.

To this end, in the transparent ultrasonic sensor-based ultrasonic optical composite imaging system 1 according to the embodiment of FIG. 5, a mechanical scanner 40 may perform scanning by moving the coaxially aligned light source 10 and the TUT 20 as one unit.

As actuators constituting the mechanical scanner 40, various types of actuators known in the art, such as linear motors, stepping motors, and rotary motors, may be used to suit the purpose of the transparent ultrasonic sensor-based ultrasonic optical composite imaging system 1.

Figure 6:
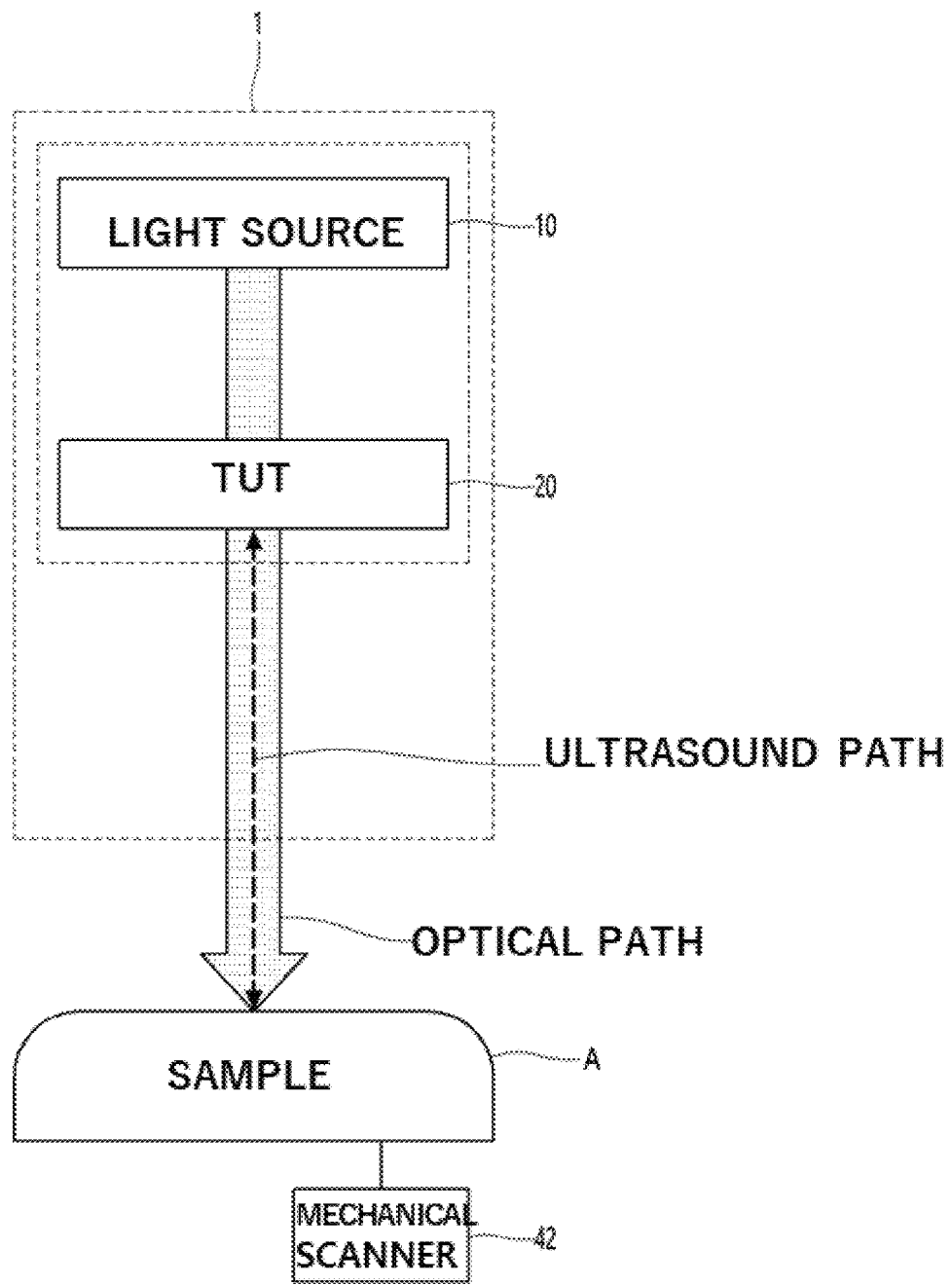
FIG. 6 is a block diagram showing a fourth embodiment of a transparent ultrasonic sensor-based ultrasonic optical composite imaging system.

FIG. 6 is a block diagram illustrating a fourth embodiment of a transparent ultrasonic sensor-based ultrasonic optical composite imaging system.

The embodiment of FIG. 6 is a case in which a mechanical scanner 42 is added to the transparent ultrasonic sensor-based ultrasonic optical composite imaging system 1, similar to the embodiment of FIG. 5. However, while the mechanical scanner 40 of FIG. 5 performs scanning by moving the light source 10 and the TUT 20, the mechanical scanner 42 of FIG. 6 may perform scanning by moving the sample A.

Like the mechanical scanner 40 of FIG. 5, various types of actuators known in the art, such as linear motors, stepping motors, and rotary motors, may be used to suit the purpose of the transparent ultrasonic sensor-based ultrasonic optical composite imaging system 1

Figure 7:
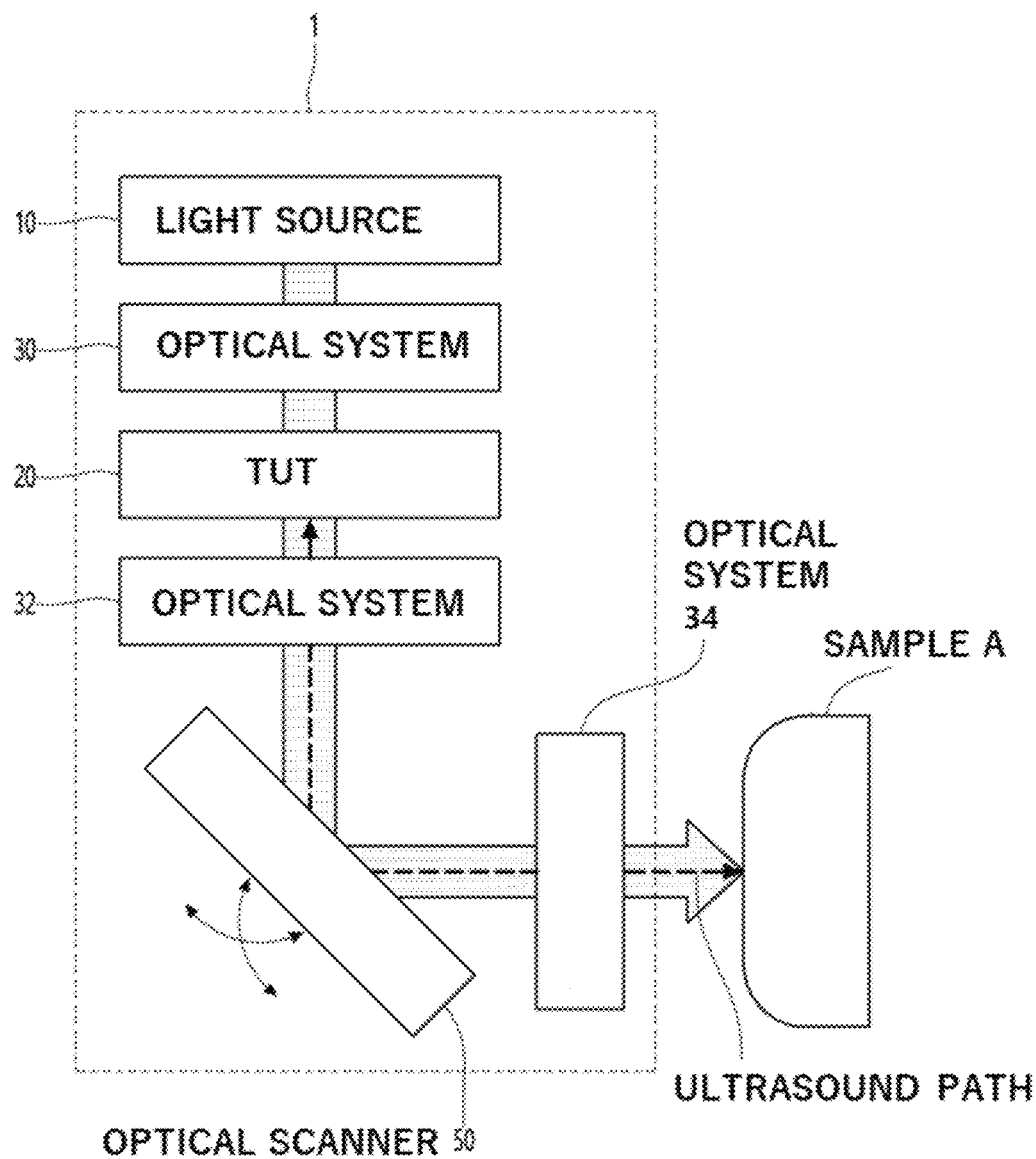
FIG. 7 is a block diagram showing a fifth embodiment of a transparent ultrasonic sensor-based ultrasonic optical composite imaging system.

FIG. 7 is a block diagram illustrating a fifth embodiment of a transparent ultrasonic sensor-based ultrasonic optical composite imaging system.

As shown in FIG. 7, the transparent ultrasonic sensor-based ultrasonic optical composite imaging system 1 may further include an optical scanner 50 in addition to the light source 10 and the TUT 20.

In FIG. 7, the optical scanner 50 may be disposed between the TUT 20 and the sample A to perform scanning.

As the optical scanner 50, a variety of conventionally known optical scanners, such as a galvanometer scanner or a scanner using a micro-electro-mechanical system (MEMS), may be used to suit the purpose of the transparent ultrasonic sensor-based ultrasonic optical composite imaging system 1.

Meanwhile, if necessary, the optical system 30 and/or the optical system 32 may be omitted or at least one thereof may be included.

Figure 8:
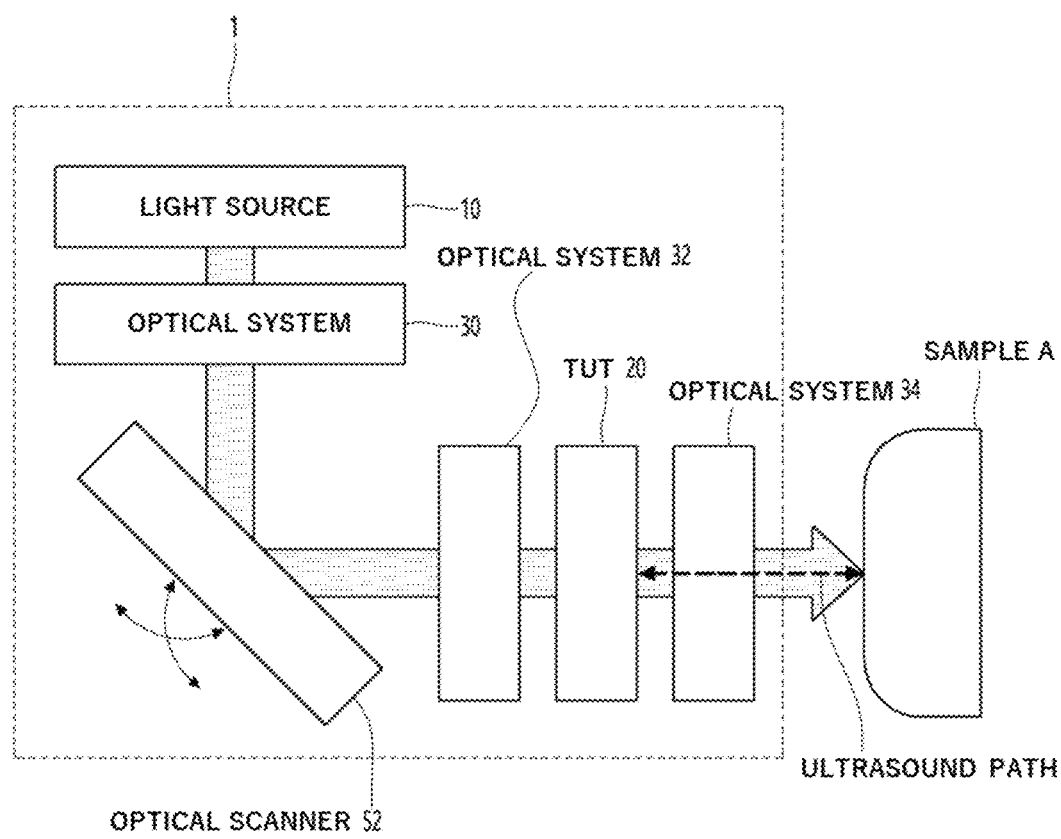
FIG. 8 is a block diagram showing a sixth embodiment of a transparent ultrasonic sensor-based ultrasonic optical composite imaging system.

FIG. 8 is a block diagram illustrating a sixth embodiment of a transparent ultrasonic sensor-based ultrasonic optical composite imaging system.

A difference between the embodiment of FIG. 8 and the embodiment of FIG. 7 is that, in the embodiment of FIG. 7, the optical scanner 50 is disposed between the TUT 20 and the sample A to perform scanning, while, in the embodiment of FIG. 8, the optical scanner 52 is disposed between the light source 10 and the TUT 20.

Other than that, there is no difference between the optical scanner 50 and the optical scanner 52.

In addition, in the embodiment of FIG. 8, the optical system 30 and/or the optical system 32 may be omitted or at least one thereof may be included as necessary.

Figure 9:
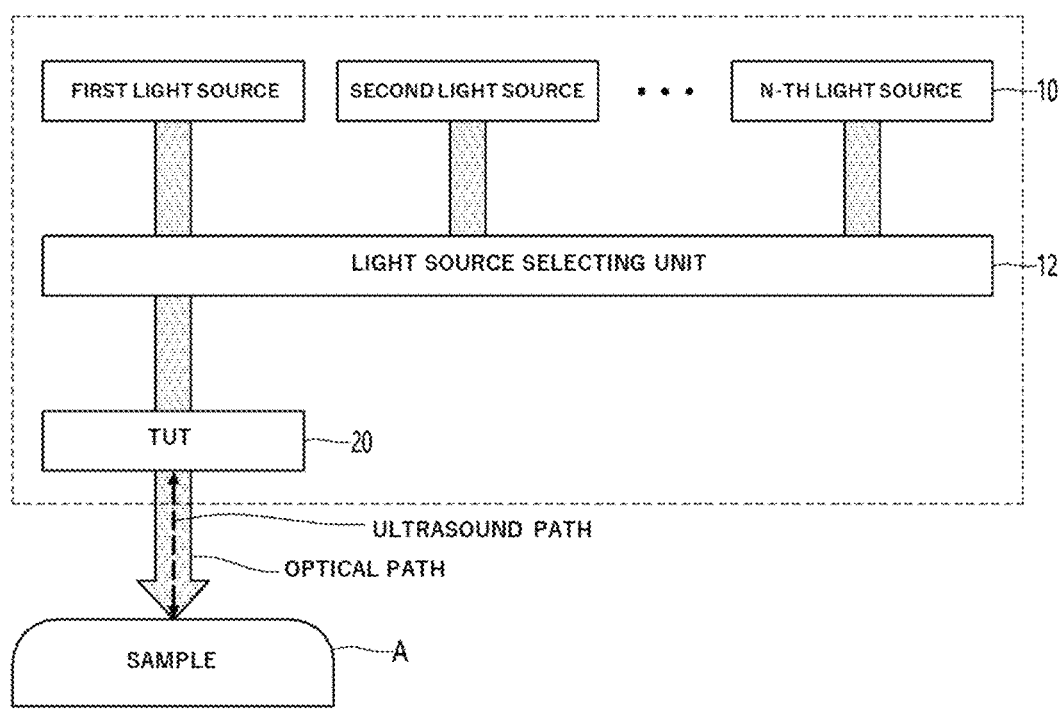
FIG. 9 is a block diagram showing a seventh embodiment of a transparent ultrasonic sensor-based ultrasonic optical composite imaging system.

FIG. 9 is a block diagram illustrating a seventh embodiment of a transparent ultrasonic sensor-based ultrasonic optical composite imaging system.

When a photoacoustic image (or signal) is acquired, the photoacoustic image (or signal) may be combined with an ultrasound image (or sensor data) acquired by a transparent ultrasonic sensor simultaneously or with a time difference.

In addition, various optical images (OCT images, fluorescence images, infrared images, etc.) may be combined with an ultrasound image together with or in place of the photoacoustic image.

To this end, the transparent ultrasonic sensor-based ultrasonic optical composite imaging system 1 may selectively use various types of light sources (including laser light sources of various wavelengths) and various types of optical systems depending on the occasion.

For example, a dual-modal (e.g., ultrasound image+photoacoustic image by a first light source) composite imaging system may be implemented according to the number of coupled optical modules.

Alternatively, a triple-modal (ultrasound image+photoacoustic image by the first light source+fluorescence image by the second light source) composite imaging system may also be implemented.

Alternatively, a quad-modal (ultrasound image+photoacoustic image by the first light source+fluorescence image by the second light source+infrared image by the third light source) composite imaging system may be implemented.

Alternatively, a composite imaging system to which more light sources are coupled may also be implemented.

To this end, the light source selecting unit 12 selects a necessary light source from among the plurality of light sources 10 and transmits the selected light source to the TUT 20.

Various optical systems, such as a mirror, a dichroic mirror, a convex lens, a concave lens, an optical window, or any combination thereof may be included in the light source selecting unit 12 to suit the purpose.

In addition, the light source 10 may also include various wavelengths and beam types (focused beam, divergent beam, collimated beam, etc.) according to the optical module or purpose.

Figure 10:
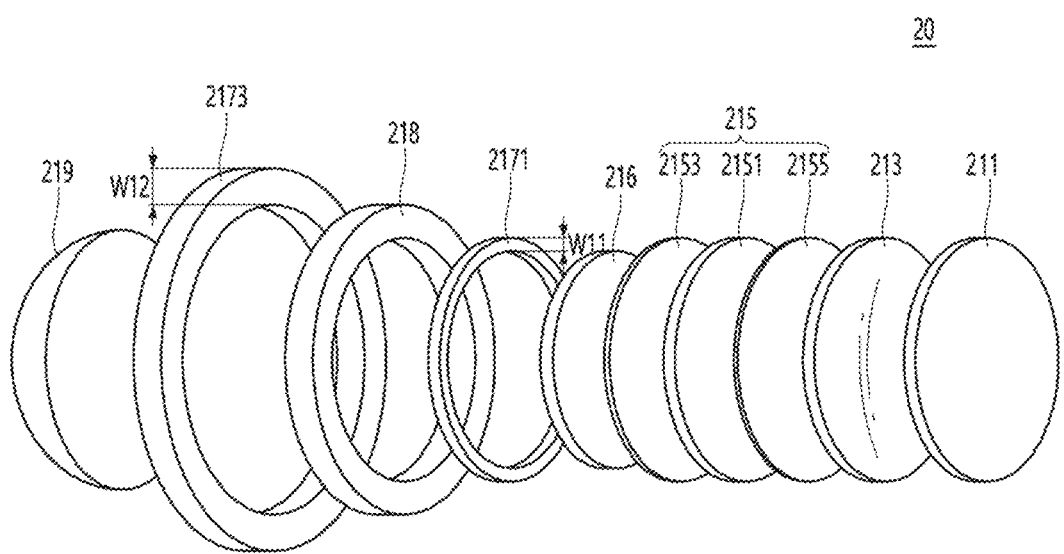
FIG. 10 is a diagram illustrating a structure of a transparent ultrasonic sensor according to an embodiment.

FIG. 10 is a view illustrating a structure of a transparent ultrasonic sensor according to an embodiment.

The transparent ultrasonic sensor 20 illustrated in FIG. 10 has a circular shape having a circular planar shape, but is not limited thereto.

As shown in FIGS. 2 to 4, the transparent ultrasonic sensor 20 according to an embodiment of the present disclosure may include, from the right side, a protective layer 211, an acoustic lens unit 213 located behind the protective layer 211, a piezoelectric unit 215 located behind the matching unit 213, first and second housings 2171 and 2173 connected to the piezoelectric unit 215, a rear layer 216 located behind the piezoelectric unit 215, an insulating unit 218 located between the first and second housings 2171 and 2173, and a correction lens unit 219 located behind the second housing 2173.

The protective layer 211 is to physically and electrically protect the transparent ultrasonic sensor 20 and to reduce a difference in acoustic impedance with a medium to which an ultrasonic signal is to be irradiated, that is, the sample A. Accordingly, the protective layer 211 has a protective function and may operate as a matching layer performing acoustic impedance matching between a liquid (e.g., water) and a living body.

The protective layer 211 may be formed of a transparent material. For example, the protective layer 211 may contain a transparent polymer, parylene.

In this example, the acoustic impedance of the protective layer 211 may be about 2.84 Maryl.

The protective layer 211 may be located on front and side surfaces of the piezoelectric unit 21 and on a side surface of the second housing 2173 located at the edge of the transparent ultrasonic sensor 20.

Accordingly, the protective layer 211 may eventually constitute the front and side surfaces of the transparent ultrasonic sensor 20.

The matching unit 213 located behind the protective layer 211 is to reduce a difference in acoustic impedance with a medium, i.e., the sample A, to which an ultrasonic signal generated by the piezoelectric unit 215 is to be irradiated.

That is, when an ultrasonic signal is generated by the operation of the piezoelectric unit 215, in order to efficiently transmit the ultrasonic signal in water, biological tissue, or a medium, other than air, the acoustic impedance of the corresponding medium should be adjusted as much as possible to minimize loss.

Each acoustic lens of the matching unit 213 of the present example may be a focused type using an acoustic lens capable of focusing light and ultrasonic signals.

As described above, since the matching unit 213 has a focus adjustment function, the ultrasonic signal reflected by the sample A and incident on the transparent ultrasonic sensor 20 is accurately focused on a desired position of the piezoelectric unit 215.

Accordingly, a focus of an ultrasound image obtained by the ultrasonic signal output from the piezoelectric unit 215 is adjusted by the focus adjustment function of the matching unit 213, so that a clear ultrasound image may be obtained.

Accordingly, the clarity of the image obtained by the operation of the transparent ultrasonic sensor 20 may be improved, so that a clear image may be obtained for a desired part of the sample A irradiated with the ultrasonic signal.

In addition, since the matching unit 213 uses an acoustic lens, a curve of the surface may be constant and the transparency of the surface may be improved, thereby reducing the loss of the ultrasonic signal when the ultrasonic signal irradiated to the sample A or reflected from the sample A is transmitted and received.

In addition, if necessary, an additional transmission or blocking layer may be formed on the matching unit 213 to transmit or block only a signal of a desired wavelength band.

The acoustic lens provided in the matching unit 213 may be formed of at least one of transparent glass, transparent epoxy, and transparent silicone.

Such an acoustic lens may be selected according to the function of the acoustic lens.

For example, when the acoustic lens functions as a matching layer performing an acoustic impedance matching function, if a piezoelectric material provided in the piezoelectric unit 215 is not in the form of a polymer, such as PVDF or PVDF-TrFE, It may be more preferable that the acoustic lens is formed of glass.

That is, when the piezoelectric material is formed of lithium niobite (LNO) or PMN-PT, acoustic impedance is as high as 30 to 40 Mrayl, but in the case of glass, acoustic impedance is as low as 210 to 15 Mrayl, which is a numerical value facilitating matching of acoustic impedance and the transparency is very good, and thus, when the piezoelectric material is not in the form of a polymer, the acoustic lens may be formed of glass.

However, in a case in which the matching layer performing the acoustic impedance matching function has already been manufactured, the acoustic lens may be formed of transparent epoxy or transparent silicone.

That is, if a matching layer (about 7 to 20 Mrayl) performing a matching function already exist between a piezoelectric material having acoustic impedance of about 30 to 40 Mrayl and a biological tissue or water having acoustic impedance of about 21 to 2 Mrayl, a separate acoustic impedance matching operation is unnecessary, so epoxies or silicones (about 21 to 3 Mrayl) having acoustic impedance similar to that of biological tissue or water are appropriate. That is, since the acoustic impedance of epoxies and silicones have acoustic impedance almost similar to those of biological tissue or water, separate acoustic impedance matching is unnecessary.

In addition, considering the speed of sound and the speed of sound with respect to a material of the acoustic lens, a curvature of a curved surface of the acoustic lens and whether the acoustic lens is concave or convex may be determined.

For example, when the acoustic lens is formed of glass, an optical lens may be used. In this case, since the speed of light of glass is higher than that of water, the acoustic lens may be designed in a concave shape, such as a plano-concave.

When the acoustic lens is formed of transparent epoxy, a polishing process should be performed on a primarily manufactured acoustic lens to improve transparency as much as possible to finally complete the acoustic lens. As such, even when the acoustic lens is formed of epoxies, the epoxies have a faster speed of light than water, so the acoustic lens may also be manufactured in a plano-concave shape.

Even when the acoustic lens is formed of transparent silicone, like the case of epoxies, a separate polishing process should be performed to improve a finished acoustic lens as much as possible. In this case, since silicones have a speed of light lower than water, the acoustic lens may be manufactured in a convex shape, such as a plano-convex shape, unlike the cases of glass and epoxies. As such, when the acoustic lens is manufactured in a plano-convex shape, the acoustic lens may have a function of collecting light.

The piezoelectric unit 215 may include a piezoelectric layer 2151 and first and second electrode layers 2153 and 2155 located on the rear and front surfaces of the piezoelectric layer 2151, respectively.

The piezoelectric layer 2151 is a layer in which a piezoelectric effect and a converse piezoelectric effect takes place, and may contain a piezoelectric material that is at least one of lithium niobite (LNO), PMN-PT, PVDF, and PVDF-TrFE as described above.

A electromechanical coupling coefficient of LNO is very high as about 0.49, so the electromechanical energy conversion efficiency is very good.

In addition, since LNO has a low dielectric permittivity, when the piezoelectric layer 2151 is formed of LNO, the transparent ultrasonic sensor may be suitable for a large aperture single element transducer having a large opening.

In addition, since LNO has a high Curie temperature, LNO may withstand well even at a high temperature, so that the transparent ultrasonic sensor 20 having good heat resistance may be developed.

In addition, when the piezoelectric layer 2151 is formed of LNO, a single element ultrasonic sensor having a center frequency of 210 to 400 MHz may be easily developed.

When the piezoelectric layer 2151 contains PMN-PT, the piezoelectric performance ($d_{33} \sim 21500\text{-}2800$ pC/N) and electromechanical coupling coefficient ($k>0.9$) of PMN-PT are very high, so that the performance of the transparent ultrasonic sensor 20 may be improved.

Unlike LNO, PMN-PT has a high dielectric constant, so that the transparent ultrasonic sensor 20 suitable for a small aperture single or array ultrasonic sensor may be developed.

In addition, when the piezoelectric layer 2151 contains at least one of PVDF and PVDF-TrFE, the piezoelectric layer 2151 may have the following characteristics.

PVDF and PVDF-TrFE have the form of a polymer film, and it is possible to manufacture a piezoelectric layer 2151 that is flexible and stretchable, thereby reducing the thickness of the piezoelectric layer 2151 and it may be possible to manufacture the transparent ultrasonic sensor 20 for a signal of a high frequency band of about 2100 MHz by the reduced thickness.

In addition, PVDF and PVDF-TrFE have a relatively low electromechanical coupling coefficient and high receiving constant, have a wider bandwidth compared to other piezoelectric materials, and may be easy to manufacture in either a single device or an array type device.

Here, a single element (e.g., a single ultrasonic sensor) may refer to an ultrasonic sensor in which the number of all components including a piezoelectric material is one. In addition, an array-type element (e.g., an array ultrasonic sensor) may be an ultrasonic sensor in which the number of all components including a piezoelectric material is plural (n), and generally may be configured in a form mainly used in hospitals. In this case, the shape may be a linear shape, a convex shape, a 2D matrix, or the like.

In this example, similar to PMN-PT, it may be possible to manufacture both single or array ultrasonic sensors with small apertures.

The material characteristics of the piezoelectric layer 2151 may be summarized in Table 1 below.

TABLE 1

| | LNO | PMN-PT | PVDF & PVDF-TrFE |
|---|---|---|---|
| Size | Large | Small | Medium |
| Size of band width | Medium | Medium | broad |
| Available frequency range | 1~400 MHz | 1~100 MHz | 1 kHz~100 MHz |
| Signal transmission performance | Good | Good | Bad |
| Signal reception performance | Good | Good | Good |
| Electric machine coupling coefficient | Medium | Good | Bad |

The first and second electrode layers 2153 and 2155 respectively located on the front and rear surfaces of the piezoelectric layer 2151 may receive a (+) drive signal and a (−) drive signal from a drive signal generator (not shown), respectively, and exhibit a converse piezoelectric effect on the piezoelectric layer 2151 so that an ultrasonic signal may be transmitted toward the sample A, and conversely, receive an electrical signal generated by the piezoelectric effect of the piezoelectric layer 2151 based on the ultrasonic signal received after being reflected by the sample A to be output externally. The first and second electrode layers 2153 and 2155 may be formed of a transparent conductive material as described above, and may contain, for example, at least one of silver nanowire (AgNW), ITO, carbon nanotube, and graphene.

For easy coupling with the first housing 2171 and the second housing 2173, a size of the first electrode layer 2153 and a size of the second electrode layer 2155 may be different from each other.

Accordingly, in the first and second electrode layers 2153 and 2155 having a circular planar shape, a diameter of the second electrode layer 2155 is different from a diameter of the first electrode layer 2153, so that a portion (e.g., an edge portion) of the second electrode layer 2155 may be drawn out from the edge portion of the first electrode layer 2153.

When an electrical signal (e.g., a pulse signal) is applied to the piezoelectric material, the piezoelectric material (i.e., the piezoelectric layer 2151) vibrates back and forth to generate an ultrasonic signal, and the ultrasonic signal may also be generated even from a rear surface of the piezoelectric layer 2151 facing the sample A, as well as a front surface opposite to the rear surface.

At this time, since the ultrasonic signal generated from the rear surface is not transmitted toward the sample A, the ultrasonic signal generated from the rear surface acts as a noise signal. Also, a portion of the ultrasonic signal reflected by the sample A and returned may pass through the matching unit 215 and output toward the correction lens unit 219.

Therefore, the rear layer 216 is located on the rear surface of the piezoelectric unit 215 to damp the ultrasonic signal generated from the rear surface of the piezoelectric unit 215 and to damp the ultrasonic signal reflected by the sample A.

As such, since the rear layer 216 is located on the rear surface of the piezoelectric unit 215 (that is, the surface located opposite to the front surface of the piezoelectric unit 215 on which the reflected ultrasonic signal is incident), the incident ultrasonic signal does not pass through the rear surface of the piezoelectric unit 215.

Accordingly, unnecessary signal interference by the ultrasonic signal passing through the rear surface of the piezoelectric unit 215 may be prevented, and loss of the ultrasonic signal reflected by the piezoelectric unit 215 may be prevented, thereby reducing a ring down signal to reduce ring down phenomenon.

Ring down, as a phenomenon in which unnecessary signals are elongated in a time axis, is a factor adversely affecting image generation.

Accordingly, the rear layer 216 may be appropriately manufactured by adjusting at least one of acoustic impedance and thickness in order to reduce the ring-down phenomenon.

When the rear layer 216 is formed of a material having a high acoustic impedance, the ring-down phenomenon is reduced, and the reduction of the ring-down phenomenon on the time axis is similar to the meaning of widening of a bandwidth in a frequency domain. However, instead, a magnitude of the entire ultrasonic signal may also be damped by the rear layer 216 during transmission and reception of the ultrasonic signal.

Conversely, when the rear layer 216 is formed of a material having a relatively low acoustic impedance, the bandwidth may be reduced without significantly reducing the ring down phenomenon, but the amount of transmission and reception of ultrasonic signals may be increased.

The rear layer 216 may also be formed of a transparent non-conductive material, and may be formed of, for example, transparent epoxy (e.g., Epotek301) or transparent glass.

When the rear layer 216 is formed of Epotek301, if the acoustic impedance is as low as 3.1 Mrayl, low signal damping is achieved, so that the transparent ultrasonic sensor 20 may obtain a relatively high signal.

In addition, Epotek301 has a very high transparency, such as having a transparency of about 95% or more at a wavelength of 380 nm to 2000 nm and cured at room temperature, and thus, the rear layer 216 is easily manufactured.

When the rear layer 216 is formed of glass, transparency and flatness are high and a separate curing process is unnecessary.

When the glass has an acoustic impedance of about 213 Mrayl, a pulse length is reduced due to a high signal damping operation in the rear layer 216, which reduces the ring-down effect but exhibits the effect of increasing the bandwidth of the frequency of the transparent ultrasonic sensor 20.

The rear layer 216 may be omitted if necessary.

The first housing 2171 and the second housing 2173 are respectively connected to the first electrode layer 2153 and the second electrode layer 2155 as described above. Accordingly, the first housing 2171 and the second housing 2173 may be formed of a transparent conductive material containing a conductive material (e.g., copper) through which an electric signal is transmitted.

Accordingly, the first housing 2171 may receive a corresponding signal through a first signal line L1 (not shown) and transmit the received signal to the first electrode layer 2153, and conversely, may output a signal applied from the first electrode layer 2153 to the first signal line L1.

The second housing 2173 may also receive the corresponding signal through a second signal line L2 (not shown), which is a separate signal line from the first signal line L1, and transmits the received signal to the second electrode layer 2155, and conversely, may output from a signal applied from the second electrode layer 2155 to the second signal line L2.

In this example, the signal input to the first signal line L1 may be a pulse signal, and the signal flowing into the second signal line L2 may be a ground signal or a shield signal (−), so that the first housing 2171 may transfer the pulse signal to the first electrode layer 2153, and the second housing 2173 may transfer the ground signal to the second electrode layer 2155.

The first housing 2171 and the second housing 2173 may have a ring shape and may be located to be in contact with the edge portion of the corresponding electrode layers 2153 and 2155, respectively, in contact therewith, i.e., in contact with a circular side surface.

That is, the first electrode layer 2153 and the second electrode layer 2155 may be inserted and mounted into an empty space located inside the first housing 2171 and the second housing 2173.

Accordingly, as shown in FIG. 2, the first housing 2171 and the second housing 2173 may be located to surround an actual active region AR1 of the transparent ultrasonic sensor 20, thereby minimizing a reduction in the active region AR1 due to the first and second housings 2171 and 2173, substantially, the first housing 2171.

As described above, since the first housing 2171 and the second housing 2173 serve to transmit electrical signals to the corresponding electrode layers 2153 and 2155, the first housing 2171 and the second housing 2173 may contain a material having good conductivity.

Since the first housing 2171 is located at the edge portion of the first electrode layer 2151 located on the entire rear surface of the piezoelectric layer 2151 through which light is received, the first housing 2171 may have a width W11 as thin as possible and may have a thickness as thick as possible to minimize a signal loss rate due to wiring resistance or the like.

As shown in FIGS. 3(a), 3(b), 3(c), 3(d) and 4, the second housing 2173 is coupled to the second electrode layer 2155 having a larger diameter than the first electrode layer 2153, and thus has a larger diameter than the first housing 2171.

In addition, since the second housing 2173 is located on an outer side than the first housing 2171 to serve to protect the transparent ultrasonic sensor 20, the second housing 2173 may have a width and thickness greater than the width and thickness of the first housing 2171.

Accordingly, the first electrode layer 2153 and the first housing 2171 may be located in the second housing 2173.

In addition, as already described, an outer surface of the second housing 2173 exposed to the outside is covered with the protective layer 211 to prevent a noise signal from being introduced into the transparent ultrasonic sensor 20 through the second housing 2173.

Since the second housing 2173 does not affect a light receiving area of the piezoelectric layer 2151, a size thereof may be increased as necessary.

In addition, a desired optical component may be coupled to the second housing 2173 by forming a screw thread or a connector on the second housing 2173. In this case, the second housing 2173 may function as a coupling portion for coupling with other components.

The insulating unit 218 may be located between the first housing 2171 and the second housing 2173 that transmits the corresponding electric signals to the corresponding electrode layers 2153 and 2155 and is located in contact with the corresponding housings 2171 and 2173 to insulate the first housing 2171 and the second housing 2173 to prevent an electric short or short and serve to fix the positions of the first housing 2171 and the second housing 2173.

The insulating unit 218 may be formed of a transparent insulating material, such as non-conductive epoxy. When the matching unit 213 uses a plano-concave acoustic lens as an example, a focus of light and an ultrasonic signal incident after being reflected from the sample A may be adjusted by the acoustic lens of the matching unit 213, but after passing through the matching unit 213, a light spreading phenomenon may occur.

In this case, a curvature of the correction lens unit 219 may be selectively used according to a position at which light is finally positioned.

As such, the correction lens unit 219 affects only the focus of light regardless of the focus of the ultrasonic signal, but the acoustic lens of the matching unit 213 may affect both the focus of the ultrasonic signal and the focus of the light.

The correction lens unit 219 may be omitted if necessary, and a focal length of light may be adjusted by changing the correction lens unit 219.

In addition, the correction lens unit 219 may have a confocal function of simultaneously adjusting the focus of the reflected and received ultrasonic signal and the focus of the light. However, when the correction lens unit 219 has a confocal function, the correction lens unit 219 should be designed in consideration of the shape of light before passing through the transparent ultrasonic sensor 20.

In this example, the correction lens unit 219 includes a single lens, but is not limited thereto. In addition to a single lens, such as a plano-convex lens, the correction lens unit 219 may additionally include a lens for aberration correction to include a plurality of lenses.

When all the components located in the active region AR1 of the transparent ultrasonic sensor 20 having such a structure are formed of a transparent material through which light is transmitted, the transparent ultrasonic sensor 20 has the following characteristics:

First, since the optical impedance is matched, that is, matched by the operation of the matching unit 213, the reliability of a signal output from the transparent ultrasonic sensor 20 may be improved.

In addition, due to the use of the acoustic lens having a focus adjustment function used in the matching unit 213, the focus of light reflected by the sample A and the ultrasonic signal is adjusted so that light and the ultrasonic signal may be focused at an accurately desired position of the piezoelectric unit 215. Accordingly, the clarity of the ultrasound image obtained by the signal output from the transparent ultrasonic sensor 20 may be significantly improved, so that not only the presence of the corresponding sample A but also an accurate shape of the detected sample A may be recognized.

In addition, as already described, since the components (e.g., 211 to 216 and 219) constituting the transparent ultrasonic sensor 20 are all formed of transparent materials, such as transparent glass, transparent epoxy, and transparent silicone, light output from the light source 10 may directly pass through the transparent ultrasonic sensor 20 and be irradiated toward the corresponding sample A.

Accordingly, the arrangement of the optical system including the transparent ultrasonic sensor 20 is free and the utilization of the space in which the optical system is installed may be improved.

In addition, the correction lens unit 219 may be selectively used according to the user's needs, and the focal length of light may be adjusted by changing the correction lens unit 219.

In addition, when an optical lens having a plano-concave shape with a coating for 400 to 21000 nm is used as the acoustic lens according to the user's need, light may easily transmit at 400 to 21000 nm, so that the clarity of an ultrasound image may be improved. As a specific coating technique and thickness, a conventionally known coating technique may be widely applied within a range that meets the needs, and coating on the surface of the optical lens may be omitted.

When the optical lens having a plano-concave shape is used as the acoustic lens 213, the phenomenon of light spreading due to the acoustic lens may occur but may be supplemented by the correction lens unit 219 and a focus of light may be adjusted at a desired point. In this manner, the range of selection of the acoustic lens may be widened by the use of a compensating lens.

The shape of light is maintained by focusing adjustment by the acoustic lens 213 and the correction lens unit 219, and accordingly, a fine focus may be maintained, so that a high-resolution optical image (e.g., photoacoustic image or optical coherence tomography image) may be obtained.

In addition, the first and second signal lines L1 and L2 are connected to the first and second housings 2171 and 2173 constituting the housing of the transparent ultrasonic sensor 20, respectively, to apply an electrical signal to the first and second electrodes 2153 and 2155, the signal lines L1 and L2 may be easily connected.

Furthermore, by forming a screw thread 21731 or the like in the second housing 2173, which is an outer housing, connection or coupling with other optical elements may be facilitated. In this manner, since a required optical element is coupled to the second housing 2173 located at a portion completely unrelated to a path of light exit from the light source 10, light is normally incident on the piezoelectric unit 215 of the transparent ultrasonic sensor 20 without loss, and since light passes through the center of the transparent ultrasonic sensor 20 in a normal direction, light and an ultrasonic signal may be easily aligned.

Here, being perpendicular may mean that light travels in a direction perpendicular to an incident surface of the transparent ultrasonic sensor (e.g., the transparent ultrasonic sensor).

As such, when light is vertically incident on the ultrasonic sensor, the focal positions of the light and the ultrasonic signal may exactly match, and thus the clarity of an image obtained from the transparent ultrasonic sensor may be further improved.

As already described, a matching layer for minimizing ultrasonic energy loss in a medium due to a difference in acoustic impedance between the air and the medium may be present.

There may be more than one matching layer.

In a comparative example, the matching layer may be formed as follows.

When a medium of an ultrasonic signal is water or biological tissue (1.5 Mrayl), acoustic impedance matching is required for maximum transmission/reception efficiency of ultrasonic energy when a piezoelectric layer is LNO (34.5 Mrayl) or PMN-PT (37.1 Mrayl). In this case, more than one matching layer of material between 37.1 and 1.5 Mrayl may be required.

At this time, when a specific matching layer is generated using a KLM simulation tool (PiezoCAD, PZFLEX, etc.), a waveform of an ultrasonic signal transmitted from water or biological tissue should be checked through simulation to find a material of an appropriate matching layer, and since a thickness of the generated matching layer also significantly affects a waveform of the ultrasonic wave, the thickness of the matching layer needs to be adjusted to find an appropriate thickness. Theoretically, a thickness of a minimum loss of wave energy is a minimum loss at a desired thickness of $\lambda/4$ by a wave equation ($c=\lambda * f$, c: speed of sound about 1480 m/s, $\lambda$: wavelength, f: desired center frequency).

In a typical ultrasonic sensor, a first matching layer is often formed of a mixture (7.9 Mrayl) of silver powder and epoxy. At this time, it is possible to adjust acoustic impedance according to a mixing ratio of the silver powder and the epoxy, and, for example, silver powder:epoxy=3:1.25.

Thereafter, a second matching layer may be generated by parylene (2.8 Mrayl) coating.

If the piezoelectric layer is PVDF or PVDF-TrFE (about 4 Mrayl), only parylene coating may be used to generate one matching layer. Here, the matching layer formed by parylene coating may serve not only as a matching layer but also as protection and insulation from the outside.

However, in the case of the transparent ultrasonic sensor 20 according to the present example, since the components (e.g., 211 to 216 and 219) located in the active region AR1 are transparent, the matching layer 213 may be formed using glass in the case of LNO or PMN-PT constituting the piezoelectric layer. At this time, it is slightly different depending on a raw material of glass (e.g. Borosilicate glass=13 Mrayl, crown glass=14.2 Mrayl, quartz=14.5 Mrayl, plate glass=10.7 Mrayl, sodalime glass=13 Mrayl), so desired glass may be appropriately selected and used.

Thereafter, a second matching layer (e.g., 2 to 6 Mrayl) may be generated using transparent epoxies or silicones (e.g., PDMS), and a third matching layer may be generated using parylene coating. In this case, generating of the second matching layer may be omitted and the second matching layer (e.g., 211) may be formed on the first matching layer (e.g., 213) directly using parylene coating. Also, in this case, a desired matching layer may be generated using a simulation waveform resulting from a KLM simulation.

In the transparent ultrasonic sensor 20 according to this example, as an example, an optical lens formed of borosilicate is used as the first matching layer, and a second matching layer is formed on the first matching layer through parylene coating, so that acoustic impedance matching and protection and signal isolation from the outside may be performed.

As already described, the optical lens may perform not only the function of acoustic impedance matching, but also focusing, that is, focusing the ultrasonic signal generated from the piezoelectric layer.

Since the transparent ultrasonic sensor 20 is mainly used for image acquisition, focusing of an ultrasonic signal is a factor which significantly affects high resolution and high sensitivity.

DETAILED DESCRIPTION OF MAIN ELEMENTS

1: transparent ultrasonic sensor-based ultrasonic optical composite imaging system
10: light source
12: light source selecting unit
20: TUT
30, 32, 34: optical system
40, 42: mechanical scanner
50, 52: optical scanner
211: protective layer
213: matching unit
215: piezoelectric unit
2151: piezoelectric layer
2153: first electrode layer
2155: second electrode layer
216: rear layer
2171: first housing
2173: second housing
218: insulating unit
219: correction lens
A: sample

The invention claimed is:

1. A transparent ultrasonic sensor-based ultrasonic optical composite imaging system comprising:
   at least one light source; and
   a transparent ultrasonic sensor coaxially aligned with light emitted from the light source and allowing the light emitted from the light source to be transmitted therethrough,
   wherein the transparent ultrasonic sensor is disposed between the light source and a subject,
   wherein the transparent ultrasonic sensor comprises:
      a matching unit performing optical impedance matching and formed of a transparent material;
      a piezoelectric layer located behind the matching unit and formed of a transparent material;
      a first electrode layer and a second electrode layer located on a rear surface and a front surface of the piezoelectric layer, respectively, the first electrode layer and the second electrode layer being formed of a transparent conductive material;
      a first housing connected to the first electrode layer; and
      a second housing connected to the second electrode layer,
   wherein sizes of the first electrode layer and the second electrode layer are different from each other, and
   wherein each of the first housing and the second housing is formed in a ring shape having an empty space in the middle.

2. The transparent ultrasonic sensor-based ultrasonic optical composite imaging system of claim 1, further comprising:
   an optical system between the light source and the transparent ultrasonic sensor.

3. The transparent ultrasonic sensor-based ultrasonic optical composite imaging system of claim 1, further comprising:
   an optical system between the transparent ultrasonic sensor and the subject.

4. The transparent ultrasonic sensor-based ultrasonic optical composite imaging system of claim 1, further comprising:
   a mechanical scanner performing mechanical scanning by moving the light source and the transparent ultrasonic sensor as one unit.

5. The transparent ultrasonic sensor-based ultrasonic optical composite imaging system of claim 1, further comprising:
   a mechanical scanner performing mechanical scanning by moving the subject.

6. The transparent ultrasonic sensor-based ultrasonic optical composite imaging system of claim 1, further comprising:
   an optical scanner disposed between the transparent ultrasonic sensor and the subject.

7. The transparent ultrasonic sensor-based ultrasonic optical composite imaging system of claim 1, further comprising:
   an optical scanner disposed between the light source and the transparent ultrasonic sensor.

8. The transparent ultrasonic sensor-based ultrasonic optical composite imaging system of claim 1, wherein the matching unit has an acoustic lens.

9. The transparent ultrasonic sensor-based ultrasonic optical composite imaging system of claim 1, wherein the matching unit includes at least one of transparent glass, transparent epoxy, and transparent silicone.

10. The transparent ultrasonic sensor-based ultrasonic optical composite imaging system of claim 1, wherein the piezoelectric layer of the transparent ultrasonic sensor is a piezoelectric material having optically transparent characteristics.

11. The transparent ultrasonic sensor-based ultrasonic optical composite imaging system of claim 1, wherein the first electrode layer and the second electrode layer of the transparent ultrasonic sensor are electrodes having optically transparent characteristics.

12. The transparent ultrasonic sensor-based ultrasonic optical composite imaging system of claim 1, wherein the first housing is located in contact with an edge portion of the first electrode layer, and the second housing is located in contact with an edge portion of the second electrode layer.

13. The transparent ultrasonic sensor-based ultrasonic optical composite imaging system of claim 12, further comprising an insulating unit located between the first housing and the second housing and formed of a transparent insulating material.

14. The transparent ultrasonic sensor-based ultrasonic optical composite imaging system of claim 12, further comprising a protective layer located in front of the matching unit and performing acoustic impedance matching.

15. The transparent ultrasonic sensor-based ultrasonic optical composite imaging system of claim 12, further comprising a correction lens located behind a matching layer, controlling a focus of light passing through the matching layer, and formed of a transparent material.

16. The transparent ultrasonic sensor-based ultrasonic optical composite imaging system of claim 1, further comprising a rear layer located in contact with the first electrode layer and damping an ultrasonic signal.

* * * * *